(12) United States Patent
Fendley (10) Patent No.: US 7,147,111 B2
(45) Date of Patent: Dec. 12, 2006

(54) HINDERED-SETTLING FLUID CLASSIFIER

(76) Inventor: Brian K. Fendley, 122 Swanson Southard Rd., Elkin, NC (US) 28621

( * ) Notice: Subject to any disclaimer, the term of this patent is extended or adjusted under 35 U.S.C. 154(b) by 422 days.

(21) Appl. No.: 10/651,467

(22) Filed: Aug. 29, 2003

(65) Prior Publication Data
US 2005/0045535 A1 Mar. 3, 2005

(51) Int. Cl.
- B03B 5/62 (2006.01)
- B03B 5/66 (2006.01)
- B03B 11/00 (2006.01)
- B03B 5/00 (2006.01)

(52) U.S. Cl. ............. 210/522; 210/521; 210/519; 210/532.1; 210/540; 209/158; 209/160

(58) Field of Classification Search ............... 209/158, 209/160
See application file for complete search history.

(56) References Cited

U.S. PATENT DOCUMENTS

| | | | | |
|---|---|---|---|---|
| 2,738,068 A | * | 3/1956 | Marston | 209/158 |
| 2,760,634 A | * | 8/1956 | Saxe | 209/208 |
| 3,970,549 A | | 7/1976 | Ennis et al. | |
| 4,282,088 A | | 8/1981 | Ennis | |
| 4,325,819 A | | 4/1982 | Altizer | |
| 4,533,464 A | | 8/1985 | Smith et al. | |
| 6,156,083 A | * | 12/2000 | Dial | 44/596 |
| 6,425,485 B1 | * | 7/2002 | Mankosa et al. | 209/164 |

OTHER PUBLICATIONS

"Linatex Hydrosizer™"; Linatex, Inc.; Entire brochure; Published in 1995.
"Determining the Settling Velocity"; Rensselaer Polytechnic Institute; pp. 1-5; Published prior to Aug. 29, 2003.
"Fine Material Washers"; Cornerstone Equipment, Inc.; Trio Engineered Products; Entire brochure; Published prior to Aug. 29, 2003.

* cited by examiner

Primary Examiner—Krishnan S. Menon
(74) Attorney, Agent, or Firm—Schwartz Law Firm P.C.

(57) ABSTRACT

A hindered-settling fluid classifier is adapted for processing aggregate entrained in a flowing slurry. The classifier includes a classifier tank defined by walls, and having an inlet at its upstream end and an outlet at its downstream end. A slurry feed pipe is connected to the tank inlet for introducing the aggregate slurry into the classifier tank for processing. A plurality of laterally-extending flow control doors are spaced apart along a length of the classifier tank, and are adapted for interrupting flow of the aggregate slurry downstream from the tank inlet to the tank outlet. The doors define respective material settling zones each located a progressively greater distance downstream from the tank inlet. At least one water line is provided for generating an upwardly rising current in each of the material settling zones to control the settling velocity of aggregate floating downwardly towards a base of the classifier tank. A plurality of collection hoppers are located at the base of the classifier tank and below respective settling zones for collecting and classifying aggregate settling within the zones.

18 Claims, 6 Drawing Sheets

HINDERED-SETTLING FLUID CLASSIFIER

TECHNICAL FIELD AND BACKGROUND OF THE INVENTION

This invention relates to a hindered-settling fluid classifier applicable for wet processing aggregate, such as sand, coal, gravel, and ash. The invention effectively washes and classifies raw material based on its specific gravity and settling velocity. The resulting processed aggregates are commonly found in everyday items, such as paint, paper, plastics and glass, and are often used as mineral supplements for agriculture, medicines and household products.

As a result of higher quality demands and an increased use of fines, washing has become a common and necessary step in aggregate processing. Some asphalt and other sand specifications allow for greater use of fines. On-going studies by the Georgia and North Carolina transportation departments, along with the International Center for Aggregates Research, have shown high-fines mixes to be as good or better for strength and durability as many current sand specifications. As this research proves out, specifications have and will continue to change for higher-fines use. As this happens, aggregate processing plants will need to be updated or built to retain more fines.

Presently, the aggregate industry uses material-recovery systems including cyclones and sand dewatering screws to process and recover fines. Cyclones are generally expensive, and require sump tanks, high-horsepower pumps, and extensive plumbing within the processing plant. Sand-dewatering screws are a generally cost effective alternative, but have several disadvantages and limitations. Sand screws receive a quantity of slurry directly from a wet screening operation or from a classifying tank. The screw then augers out the sand product to a minimum moisture content to be conveyed and stockpiled. The resulting product is a single processed aggregate ranging in size from the largest feed to the cut-off point of fines removal. In many cases, the processed aggregate is relatively "dirty" (includes deleterious particles) and does not satisfy growing demands for high-fines usage.

SUMMARY OF INVENTION

Therefore, it is an object of the invention to provide a hindered-settling fluid classifier which effectively processes and classifies deposits high in fines (minus 100 to 200 mesh).

It is another object of the invention to provide a hindered-settling fluid classifier which recovers and simultaneously segregates aggregate in a wide range of sizes based on specific gravities.

It is another object of the invention to provide a hindered-settling fluid classifier which effectively separates deleterious particles entrained in the aggregate slurry.

It is another object of the invention to provide a hindered-settling fluid classifier which is capable of processing raw material at a rate of 200 tons/hr.

It is another object of the invention to provide a hindered-settling fluid classifier which is capable of wet processing aggregate slurry at a rate of 2000 gal/min.

It is another object of the invention to provide a hindered-settling fluid classifier which eliminates the need for aggregate processing through a sand dewatering screw.

It is another object of the invention to provide a hindered-settling fluid classifier which retains substantially more fines than traditional material-recovery systems of the prior art.

These and other objects of the present invention are achieved in the preferred embodiments disclosed below by providing a hindered-settling fluid classifier adapted for processing aggregate entrained in a flowing slurry. The classifier includes a classifier tank defined by walls, and having an inlet at its upstream end and an outlet at its downstream end. A slurry feed pipe is connected to the tank inlet for introducing the aggregate slurry into the classifier tank for processing. A plurality of laterally-extending flow control doors are spaced apart along a length of the classifier tank, and are adapted for interrupting flow of the aggregate slurry downstream from the tank inlet to the tank outlet. The doors define respective material settling zones each located a progressively greater distance downstream from the tank inlet. Means are provided for generating an upwardly rising current in each of the material settling zones to control the settling velocity of aggregate floating downwardly towards a base of the classifier tank. A plurality of collection hoppers are located at the base of the classifier tank and below respective settling zones for collecting and classifying aggregate settling within the zones.

According to another preferred embodiment of the invention, the means for generating an upwardly rising current includes at least one water line extending between the collection hoppers and the material settling zones. The water line has a plurality of openings creating respective water jets upwardly within the zones.

According to another preferred embodiment of the invention, the means for generating an upwardly rising current further includes at least one pneumatic line extending between the collection hoppers and the material settling zones. The pneumatic line has a plurality of openings creating respective air jets upwardly within the zones.

According to another preferred embodiment of the invention, a vertical dewatering cylinder is connected to each of the collection hoppers for receiving and drying aggregate gravity-fed through the collection hopper.

According to another preferred embodiment of the invention, a discharge valve is located at a bottom end of the dewatering cylinder for controlling discharge of classified aggregate outwardly from the dewatering cylinder.

According to another preferred embodiment of the invention, a flexible diverter tube communicates with the dewatering cylinder and is adapted for locating the classified aggregate discharged through the dewatering cylinder.

According to another preferred embodiment of the invention, a material diverter is connected to the diverter tube for moving the diverter tube between multiple aggregate deposit locations.

According to another preferred embodiment of the invention, a plurality of material conveyors are adapted for receiving the classified aggregate discharged through the material diverter, and for transporting the classified aggregate to respective stockpiles.

According to another preferred embodiment of the invention, a deposit chute is located above one of the plurality of material conveyors for directing the discharged classified aggregate onto the material conveyor.

According to another preferred embodiment of the invention, a fluid level control weir is located upstream of the tank outlet for controlling fluid level in the classifier tank.

According to another preferred embodiment of the invention, a drain line is connected to the tank outlet for discharging slurry overflow outwardly from the classifier tank.

According to another preferred embodiment of the invention, the plurality of flow control doors includes at least two individually controlled pivoting doors arranged side by side within each of the material settling zones. The doors are operable for movement between open and closed positions whereby the flow rate through the classifier tank from its upstream end to its downstream end is adjustable to control settling of aggregate within the material settling zones.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figures 1, 7:
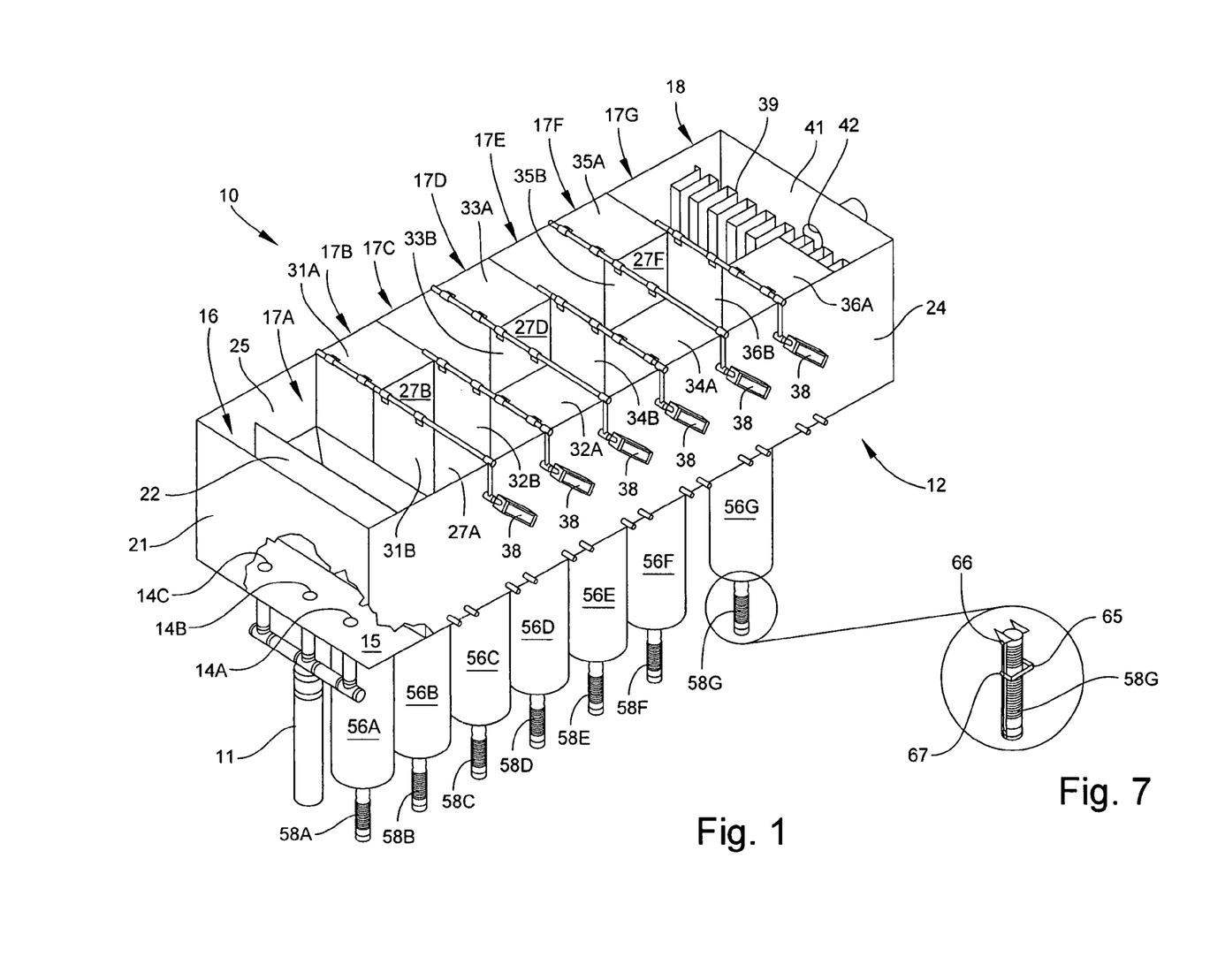
FIG. 1 is a perspective view of a hindered-settling fluid classifier according to one preferred embodiment of the present invention.
FIG. 7 is an enlarged perspective view of the material diverter tube.

Referring now specifically to the drawings, a hindered-settling fluid classifier according to the present invention is illustrated in FIG. 1, and shown generally at reference numeral 10. The classifier 10 is especially useful for washing and segregating aggregate, such as sand, coal, gravel, and ash, based on its specific gravity. While the invention has numerous applications, the following description refers specifically to wet sand processing. Prior to entering the classifier 10, the sand is diluted and entrained in a flowing slurry. Preferably, the dilution ratio is approximately 10 gpm of water for every 1 tph of total sand feed, or 100 gpm of water for every 1 tph of silt (minus 200 mesh) in the sand feed, whichever is greater.

Figure 2:
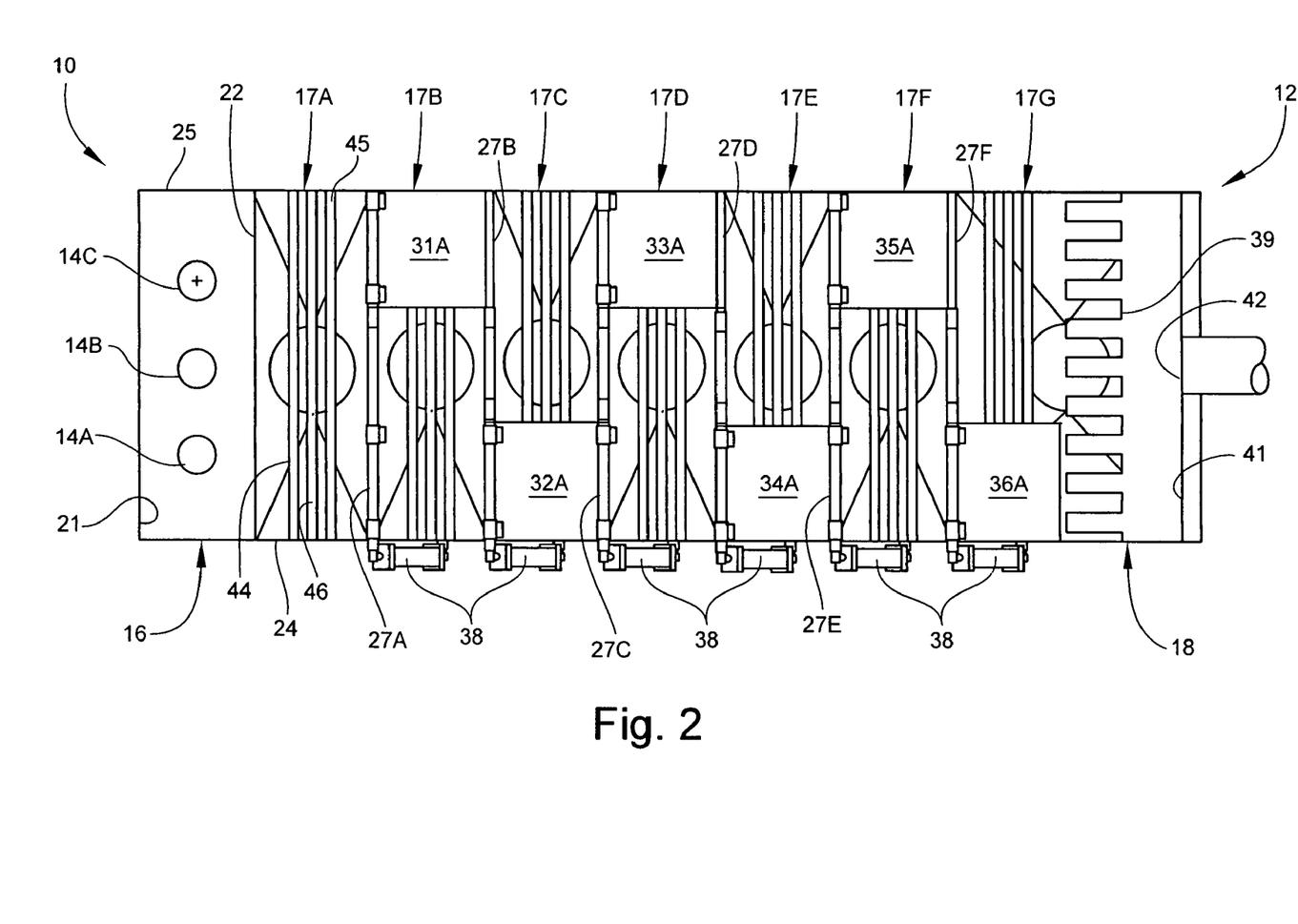
FIG. 2 is a top plan view of the fluid classifier.

Referring to FIGS. 1 and 2, the flowing slurry enters the classifier 10 through a delivery pipe 11 located at an upstream end of a classifier tank 12. The delivery pipe 11 feeds three laterally-spaced, 8-inch diameter inlets 14A, 14B, and 14C formed in a bottom wall 15 of the tank 12. According to one embodiment, the classifier tank 12 has a generally rectangular shape and is approximately 18 feet long, 6 feet wide, and 4 feet deep. The tank 12 comprises a number of material processing zones including a slurry inlet zone 16, successive downstream material settling zones 17A, 17B, 17C, 17D, 17E, 17F, and 17G and an overflow outlet zone 18.

The inlet zone 16 is formed between an upstream end wall 21 of the tank 12 and a reduced-height, interior inlet wall 22. The inlet wall 22 is located adjacent the bottom wall 15 of the tank 12 and extends upwardly approximately 3 feet, allowing at least one foot of clearance between a top of the wall 22 and an open top of the tank 12. The inlet wall 22 is spaced approximately 2 feet downstream from the end wall 21. The inlets 14A, 14B, and 14C are equally spaced from one side wall 24 of the tank 12 to the other side wall 25.

Figure 3:
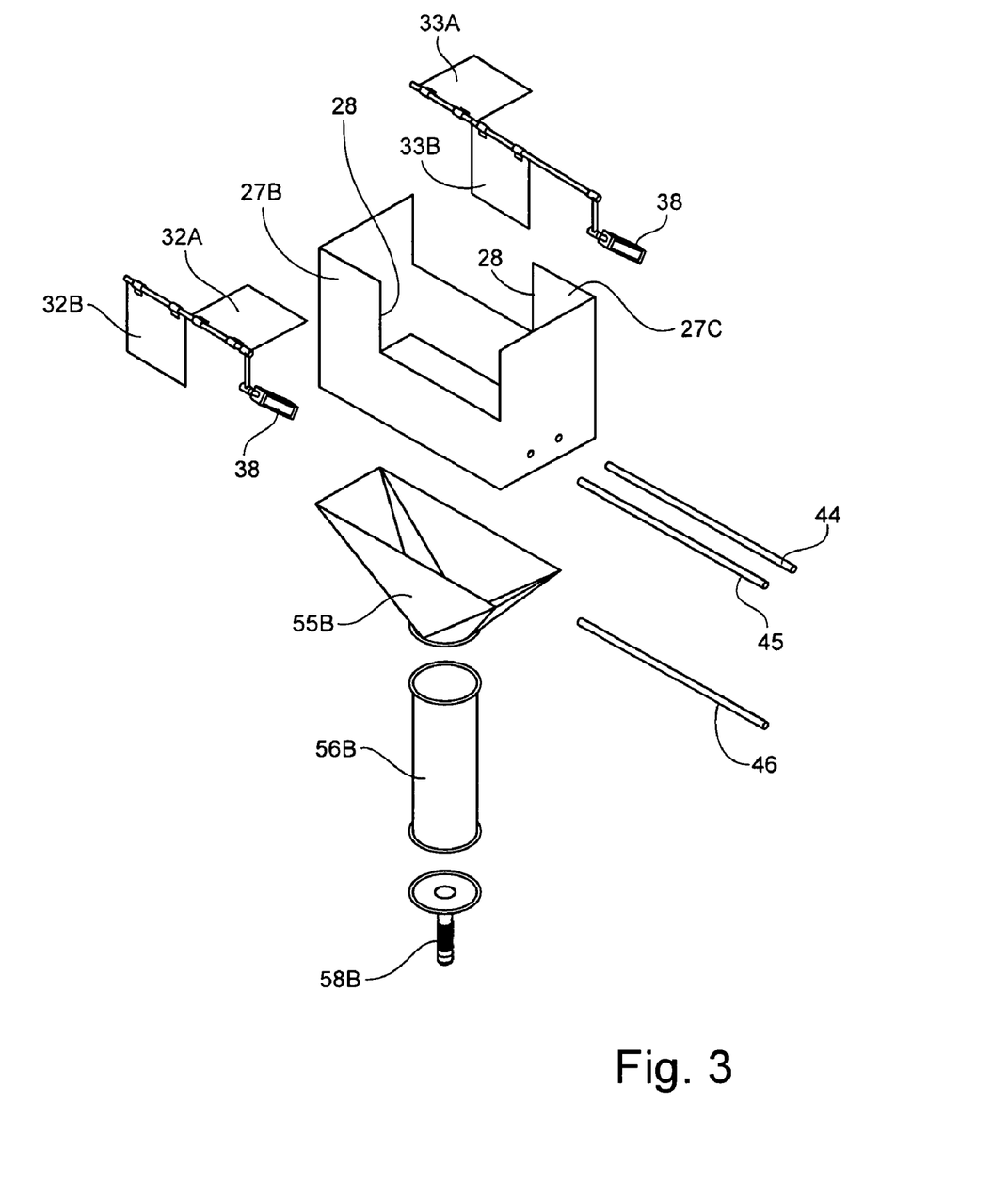
FIG. 3 is an exploded perspective view illustrating various components of one processing zone of the fluid classifier.

The material settling zones 17A–17G are defined by respective interior settling walls 27A, 27B, 27C, 27D, 27E, and 27F with cut-outs 28, best shown in FIG. 3, for accommodating respective pairs of pivoting flow control doors 31A, 31B, 32A, 32B, 33A, 33B, 34A, 34B, 35A, 35B, and 36A, 36B. The cut-outs 28 are formed in the top half of each settling wall 27A–27F, and define openings extending laterally from one side wall 24, 25 of the tank 12 to a point two-thirds the distance to the other side wall 24, 25. Cut-outs 28 of successive settling walls 27A–27F are formed adjacent opposite side walls 24, 25. The settling walls 27A–27F are spaced apart approximately two feet from each other downstream from the inlet wall 22.

Figure 4A:
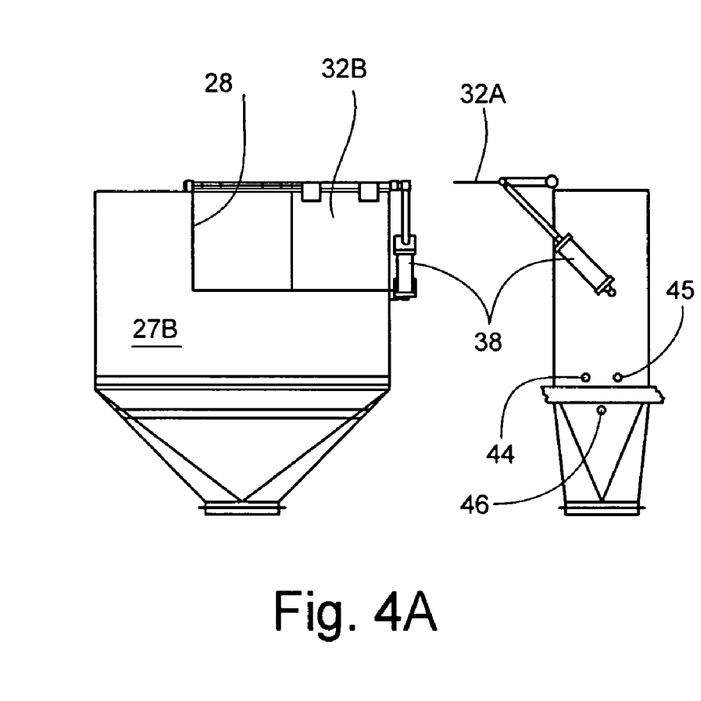
FIG. 4A is an elevational view of one processing zone of the fluid classifier, and showing the center flow control door in a raised open position and the outside flow control door in a lowered closed position.
Figure 4B:
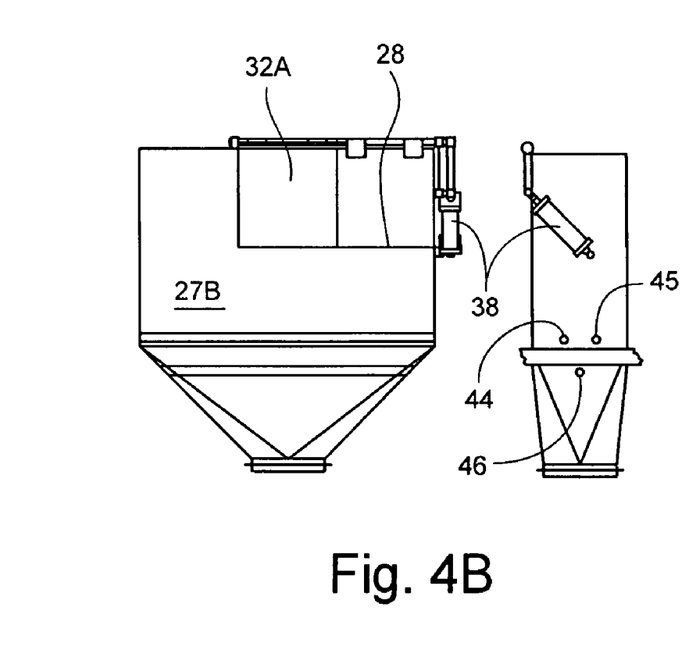
FIG. 4B is an elevational view of the processing zone with the outside flow control door in the raised open position and the center door in the lowered closed position.

As best shown in FIGS. 4A and 4B, the pairs of flow control doors 31A,B–36A,B (32A and 32B shown) fit within respective cut-outs 28 formed in the settling walls 27A–27F (27B shown) and are individually controllable by pneumatic cylinders 38. When the outside door 32A is down or closed, as shown in FIG. 4A, the center door 32B is raised or open. In this arrangement, the cylinder 38 is extended at full stroke. As the cylinder 38 retracts, the center door 32B lowers to the closed position while the outside door 32A simultaneously lifts to the open position, as shown in FIG. 4B. Collectively, the two side-by-side doors in each pair 31A,B–36A,B move within the entire rectangular opening defined by the cut-out 28. Preferably, the classifier tank 10 has at least six pairs of pivoting flow control doors 31A, B–36A,B and seven material settling zones 17A–17G.

The overflow outlet zone 18 is formed between a level control weir 39 and the downstream end wall 41 of the classifier tank 12. The level control weir 39 snakes back and forth between opposing side walls 24, 25 of the tank 12, and extends from a depth of approximately 2 feet upwardly to a point about 3 inches from the open top of the tank 12. The weir 39 is spaced approximately 2 feet upstream from the end wall 41 of the tank 12. A drain outlet 42 is formed in the end wall 41 of the tank 12 for discharging overflow slurry through a drain line.

Operation of the Fluid Classifier 10

Figure 5:
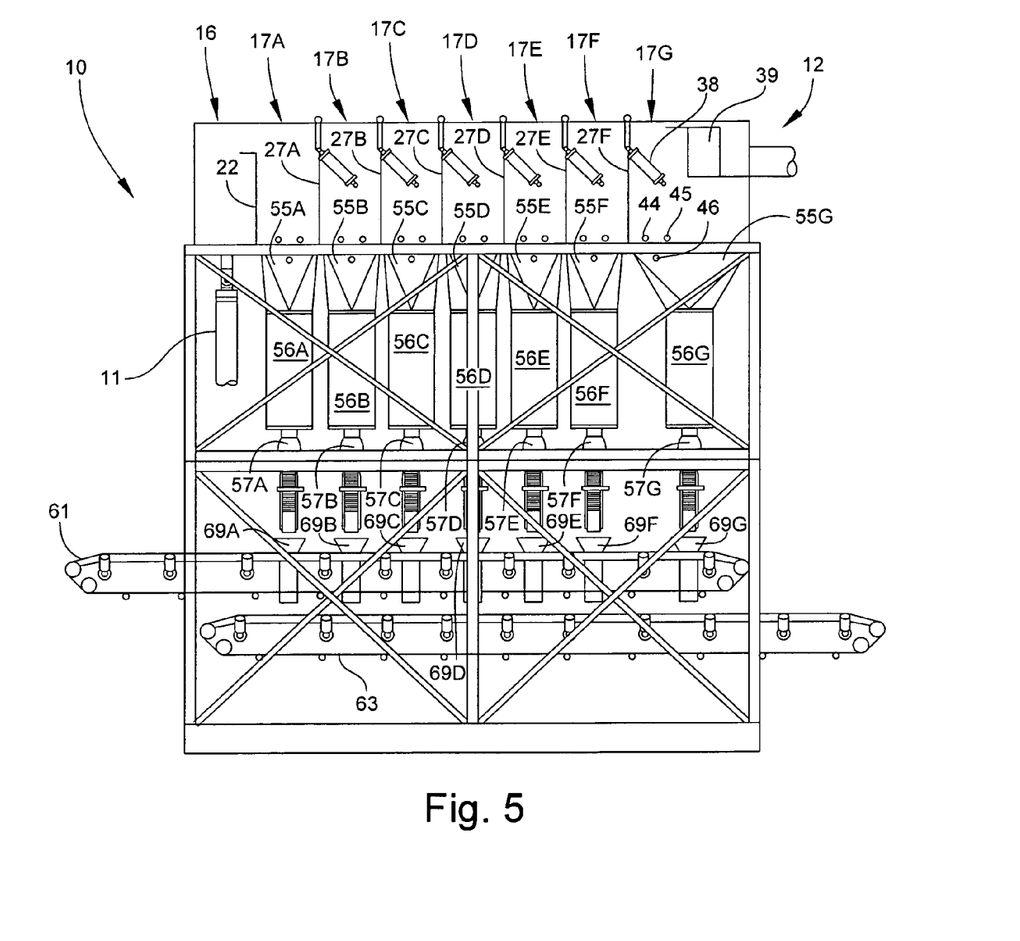
FIG. 5 is a side elevation of the fluid classifier.

Referring to FIGS. 1 and 5, upon entering the classifier tank 12 through inlets 14A–14C, the aggregate slurry fills the inlet zone 16, flows over the inlet wall 22, and moves downstream into the first of several successive material settling zones 17A–17G. As best shown in FIG. 5, a pair of pneumatic lines 44 and 45 and a water line 46 are located at the base of each zone 17A–17G and cooperate to create an upwardly rising current sufficient to control the settling velocity of material entrained in the flowing slurry. The lines 44, 45, and 46 extend laterally from one side wall 24 of the tank 12 to the other side wall 25, and are individually controllable. Preferably, the water line 46 is centrally disposed between and below the pneumatic lines 44 and 45. To prevent clogging, the lines 44, 45, and 46 have flapper valves (not shown) located at respective ports.

Material settling velocity is further controlled by arrangement of the flow control doors 31A,B–36A,B within the settling zones 17A–17G. The doors 31A,31B–36A,36B cooperate to define the flow path and control the velocity of slurry moving downstream through each zone 17A–17G. For example, when the center door 31A is open and the outside door 31B closed, the flow velocity through zone 17A is increased. Flow velocity is reduced by closing the center door 31A and opening the outside door 31B. The slower the flow velocity through a given zone 17A–17G, the more time is provided for fines in the slurry to settle out. Heavier materials can settle at higher flow rates, and are more likely to be collected towards the upstream end of the tank 12. If the slurry velocity through the tank 12 is too fast, the time required for the finest sand particles (minus 100 to 200 mesh) to settle may be insufficient. As a result, some good sand particles that could be put in product stockpiles may be kept in suspension and carried over the weir 39 to the overflow outlet zone 18. Generally, a longer tank allows for better classifying efficiency because the sand fractions have more zones within which to settle out and separate by size. Computer controlled operation of the pneumatic lines 44, 45, water line 46, and flow control doors 31A,B–36A,B enable precise weight (specific gravity) classification of settling material. Material passed downstream to the overflow outlet zone 18 is ultimately drained through the outlet 42, moved through the drain line, and lost to a settling pond.

Material settling within the zones 17A–17G is collected in respective hoppers 55A, 55B, 55C, 55D, 55E, 55F, and 55G located at the base of the tank 12. The hoppers 55A–55G have angled walls which reduce vortex current or swirling, avoid material compaction, and promote gravity feeding of material downwardly into respective dewatering cylinders 56A, 56B, 56C, 56D, 56E, 56F, and 56G. The hopper 55G is enlarged to capture any material settling in both zones 17G and 18. The vertical dewatering cylinders 56A–56G dry the segregated material received from each of the collection hoppers 55A–55G. According to one embodiment, each cylinder 56A–56G is approximately 18 inches in diameter and 48 inches long. Respective discharge valves 57A, 57B, 57C, 57D, 57E, 57F, and 57G are located at an exit end of the dewatering cylinders 56A–56G, and are controlled by the operator to regulate the discharge of material outwardly from the cylinders. Preferably, the discharge valves 57A–57G are pneumatic red pinch valves.

Figures 6, 8:
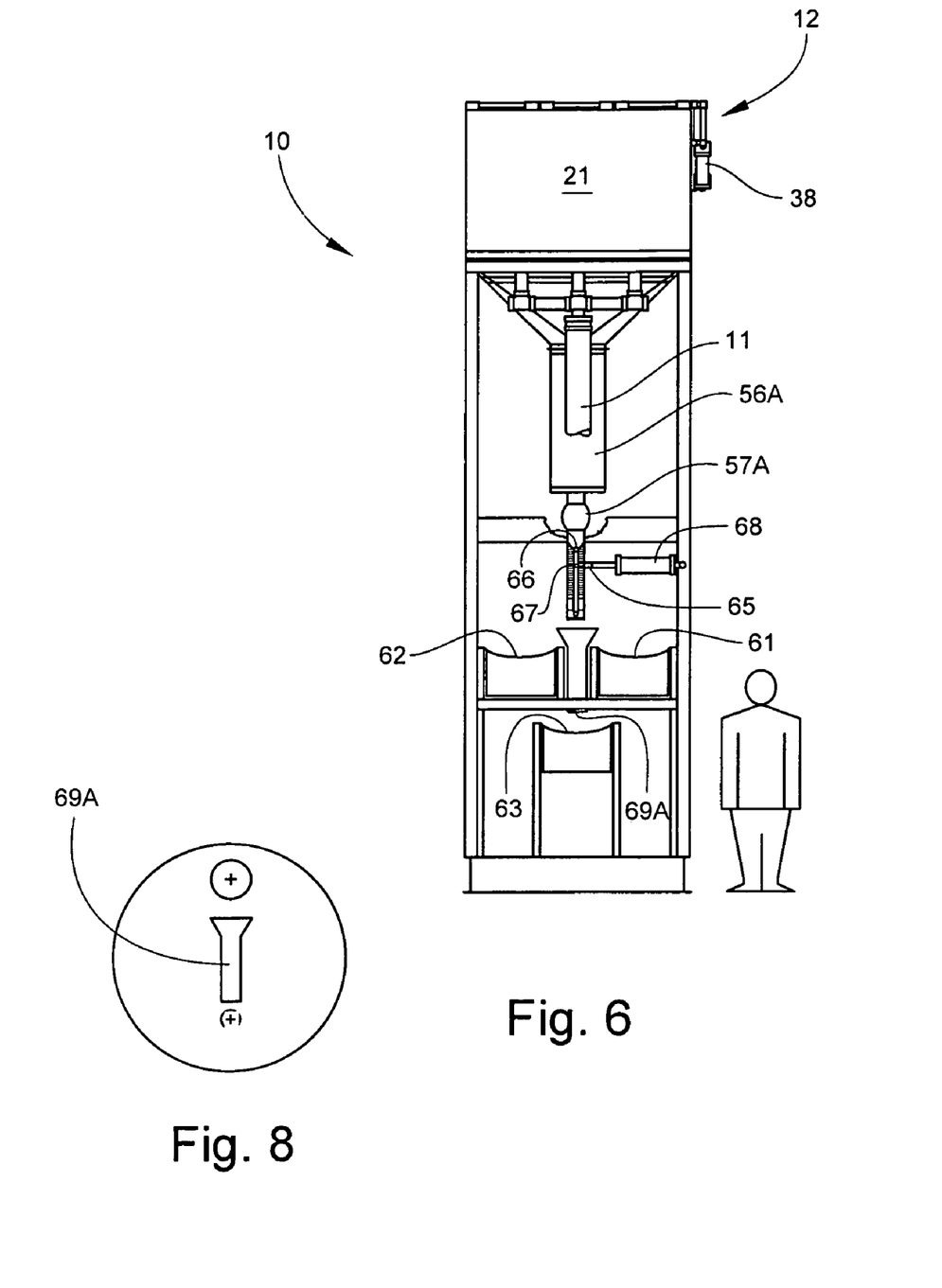
FIG. 6 is an end elevation of the fluid classifier.
FIG. 8 is an enlarged elevation of the material discharge chute.

From the dewatering cylinders 56A–56G, the material passes through respective diverter tubes 58A, 58B, 58C, 58D, 58E, 58F, and 58G onto one of three material conveyors 61, 62, and 63. As best shown in FIG. 7, each diverter tube 58A–58G is formed of a flexible accordion pipe with an abrasion-resistant interior. The tube 58A–58G is carried by a wide metal pipe clamp 65, and is adapted to pivot at multiple points 66 and 67. A pneumatic cylinder 68 (FIG. 6) is attached to the pipe clamp 65 and to the framework of the classifier 10 to control location of the tube 58A–58G over each of the three conveyors 61–63. Material is deposited from the diverter tube 58A–58G onto the lower center conveyor 63 through respective vertical deposit chutes 69A, 69B, 69C, 69D, 69E, 69F, and 69G. The conveyors 61–63 transport the classified material to respective stockpiles. Concrete sand should discharge from the classifier 10 with 15% to 20% moisture. Mason, asphalt and other sand products with a higher fines content may come out in the low 20% moisture content.

Preferably, all operations of the classifier 10 occur automatically using a system controller, such as a solid-state PLC or PC-based system. The controller is key to meeting and maintaining specification requirements, and achieving the most efficient and profitable material production. The controller includes a large operator-interface monitor with multiple screens that provide a clear, continually updated picture of how the classifier is operating. Preferably, the controller provides warnings and alarms regarding possible wasteful production due to changes in the material or to mechanical problems with the classifier 10. It may also command automatic process adjustment, and assist in trouble shooting problems.

A hindered-settling fluid classifier is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A hindered-settling fluid classifier adapted for processing aggregate entrained in a flowing slurry, said classifier comprising:
    (a) a classifier tank defined by walls, and comprising an inlet at an upstream end thereof and an outlet at a downstream end thereof;
    (b) a slurry feed pipe connected to the tank inlet for introducing the aggregate slurry into said classifier tank for processing;
    (c) a plurality of laterally-extending flow control doors spaced apart along a length of said classifier tank and adapted for interrupting flow of the aggregate slurry downstream from the tank inlet to the tank outlet, said flow control doors defining respective material settling zones each located a progressively greater distance downstream from the tank inlet, and said flow control doors comprising at least two pivoting doors arranged side by side within each of said material settling zones, and said pivoting doors being operable for movement between open and closed positions whereby the flow rate through said classifier tank is adjustable to control settling of aggregate within said material settling zones;
    (d) means for generating an upwardly rising current in each of said material settling zones to control the settling velocity of aggregate floating downwardly towards a base of said classifier tank; and
    (e) a plurality of collection hoppers located at the base of said classifier tank and below respective settling zones for collecting and classifying aggregate settling within said zones.

2. A hindered-settling fluid classifier according to claim 1, wherein said means for generating an upwardly rising current comprises at least one water line located between said collection hoppers and said material settling zones, and comprising a plurality of openings creating respective water jets upwardly within said zones.

3. A hindered-settling fluid classifier according to claim 2, wherein said means for generating an upwardly rising current further comprises at least one pneumatic line located between said collection hoppers and said material settling zones, and comprising a plurality of openings creating respective air jets upwardly within said zones.

4. A hindered-settling fluid classifier according to claim 1, and comprising a plurality of vertical dewatering cylinders connected to respective collection hoppers for receiving and drying aggregate gravity-fed through said collection hoppers.

5. A hindered-settling fluid classifier according to claim 4, and comprising a plurality of discharge valves located at respective bottom ends of said dewatering cylinders for controlling discharge of classified aggregate outwardly from said dewatering cylinders.

6. A hindered-settling fluid classifier according to claim 4, and comprising a plurality of flexible diverter tubes communicating with respective dewatering cylinders and adapted for locating the classified aggregate discharged through said dewatering cylinders.

7. A hindered-settling fluid classifier according to claim 6, and comprising a plurality of material diverters connected to respective diverter tubes for moving said diverter tubes between multiple aggregate deposit locations.

8. A hindered-settling fluid classifier according to claim 7, and comprising a plurality of material conveyors adapted for receiving the classified aggregate discharged through said material diverter tubes, and for transporting the classified aggregate to respective stockpiles.

9. A hindered-settling fluid classifier according to claim 8, and comprising a deposit chute located above one of said plurality of material conveyors for directing the discharged classified aggregate onto said material conveyor.

10. A hindered-settling fluid classifier according to claim 1, and comprising a fluid level control weir upstream of the tank outlet for controlling fluid level in said classifier tank.

11. A hindered-settling fluid classifier according to claim 1, and comprising a drain line connected to the tank outlet for discharging slurry overflow outwardly from said classifier tank.

12. A hindered-settling fluid classifier adapted for processing aggregate entrained in a flowing slurry, said classifier comprising:
   (a) a classifier tank defined by walls, and comprising an inlet at an upstream end thereof and an outlet at a downstream end thereof, said inlet comprising a plurality of laterally-spaced openings formed in one of said tank walls;
   (b) a slurry feed pipe connected to the tank inlet for introducing the aggregate slurry into said classifier tank for processing;
   (c) a plurality of laterally-extending flow control doors spaced apart along a length of said classifier tank and adapted for interrupting flow of the aggregate slurry downstream from the tank inlet to the tank outlet, said flow control doors defining respective material settling zones each located a progressively greater distance downstream from the tank inlet, and said flow control doors comprising at least two pivoting doors arranged side by side within each of said material settling zones, and said pivoting doors being operable for movement between open and closed positions whereby the flow rate through said classifier tank is adjustable to control settling of aggregate within said material settling zones;
   (d) at least one water line located within said material settling zones, and comprising a plurality of openings creating respective water jets generating an upwardly rising current in each of said material settling zones to control the settling velocity of aggregate floating downwardly towards a base of said classifier tank; and
   (e) a plurality of collection hoppers located at the base of said classifier tank and below respective settling zones for collecting and classifying aggregate settling within said zones.

13. A hindered-settling fluid classifier according to claim 12, and comprising at least one pneumatic line located between said collection hoppers and said material settling zones, and comprising a plurality of openings creating respective air jets upwardly within said zones.

14. A hindered-settling fluid classifier according to claim 12, and comprising a plurality of vertical dewatering cylinders connected to respective collection hoppers for receiving and drying aggregate gravity-fed through said collection hoppers.

15. A hindered-settling fluid classifier according to claim 14, and comprising a plurality of flexible diverter tubes communicating with respective dewatering cylinders and adapted for locating the classified aggregate discharged through said dewatering cylinders.

16. A hindered-settling fluid classifier according to claim 15, and comprising a plurality of material diverters connected to respective diverter tubes for moving said diverter tubes between multiple aggregate deposit locations.

17. A hindered-settling fluid classifier according to claim 12, and comprising a fluid level control weir upstream of the tank outlet for controlling fluid level in said classifier tank.

18. A hindered-settling fluid classifier according to claim 12, and comprising a drain line connected to the tank outlet for discharging slurry overflow outwardly from said classifier tank.

* * * * *